United States Patent [19]

White

[11] 4,280,544
[45] Jul. 28, 1981

[54] TIRE TRACTION DEVICE

[75] Inventor: Fred C. White, Renton, Wash.

[73] Assignee: B R International, Tempe, Ariz.

[21] Appl. No.: 130,583

[22] Filed: Mar. 14, 1980

[51] Int. Cl.³ .............................................. B60C 27/00
[52] U.S. Cl. .................................... 152/221; 152/179; D12/154
[58] Field of Search ............... 152/221, 179, 191, 187, 152/189, 225 R; D12/154

[56] References Cited

U.S. PATENT DOCUMENTS

| | | | |
|---|---|---|---|
| D. 247,291 | 2/1978 | Gilmartin | D12/154 |
| 923,456 | 6/1909 | Stevenson | 152/221 |
| 1,326,513 | 12/1919 | Johnson | 152/221 UX |

Primary Examiner—John T. Goolkasian
Assistant Examiner—Thomas E. Bokan
Attorney, Agent, or Firm—Warren F. B. Lindsley

[57] ABSTRACT

A traction device surrounding the tread and sidewalls of a tire. The device includes several elongated, molded plastic traction members having fastening strips secured to opposite ends. The traction members are secured about the periphery of the tire by a flexible belt or strap extending through the fastening strips at opposite sides of the tire so that the traction members extend across the tire tread from one side of the tire to the other. The traction members have a generally planar outer face. The inner face is formed with a plurality of suction cavities surrounded by sidewalls which abut the tread surface of the tire. A plurality of relatively small apertures extends from the suction cavities outwardly and communicate with recesses formed in the planar outer face of the traction members so that as the tire rolls along a road causing the traction members to sequentially contact the road surface, the contact between the undersurface of the traction members surrounding the suction cavity walls and the tire produces a vacuum within the suction cavities. The vacuum causes the traction member to simultaneously grip the tire and the road surface until the traction member is lifted from the road surface, at which time the suction within the suction cavities is broken by the admission of air through the apertures between the suction cavities and the outer surface of the traction members.

7 Claims, 6 Drawing Figures

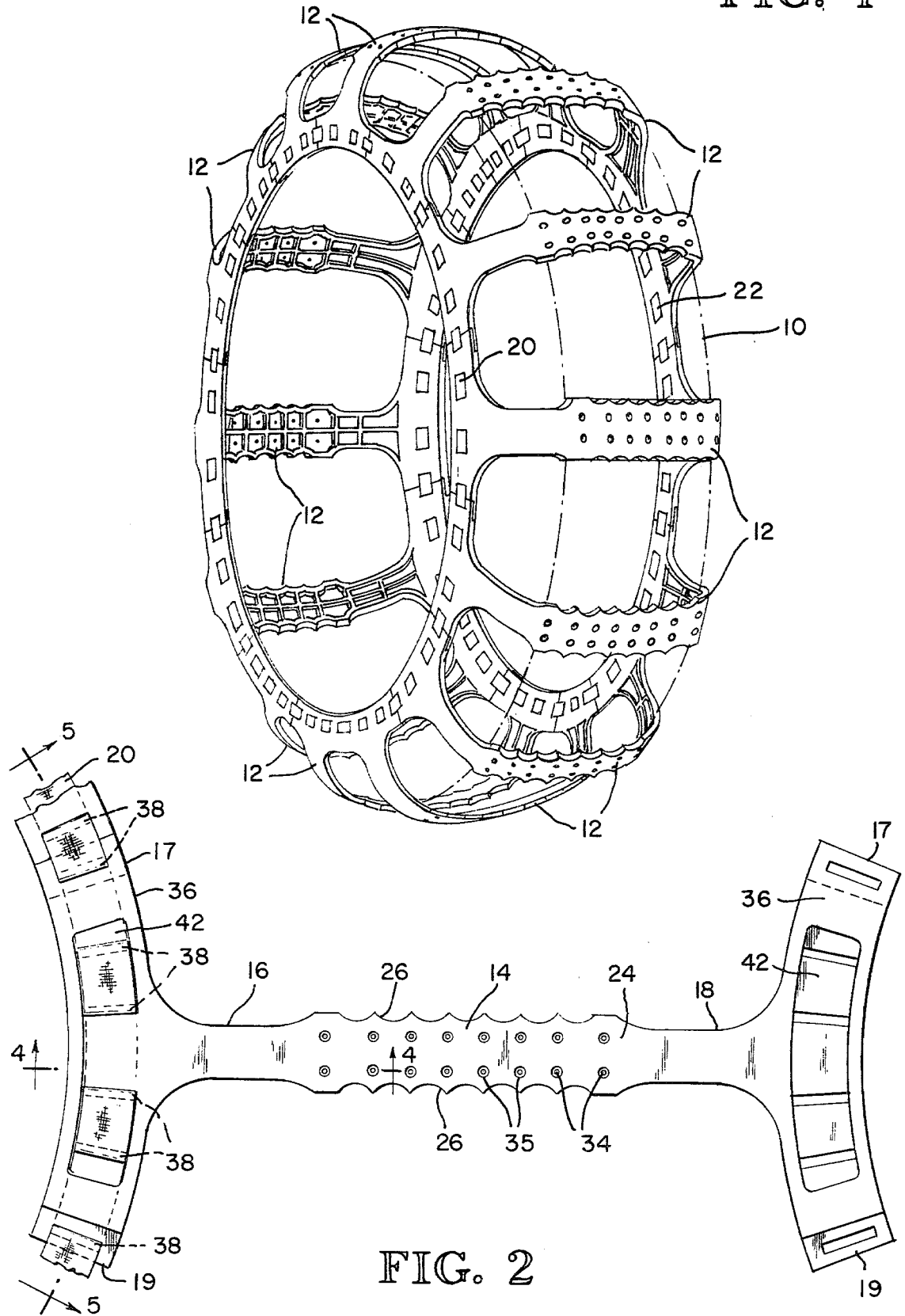

TIRE TRACTION DEVICE

BACKGROUND OF THE INVENTION

1. Field of the Invention

This invention relates to removable tire traction devices, and more particularly, to a lightweight, easily installed traction device which creates a vacuum to cause the traction device to grip the abutting surface of the tire and the road surface.

2. Description of the Prior Art

Conventional tire chains have long been used to increase traction between tires and road surfaces which have become slippery because of ice and snow. Although these devices are effective in increasing traction, they suffer from a number of disadvantages. The principal disadvantage is the difficulty of installing and removing conventional tire chains due to their heavy weight and construction. Another disadvantage of tire chains is the roughness of the ride when tire chains are installed on the vehicle tires.

In order to eliminate or at least reduce the aforementioned disadvantages inherent in conventional tire chains, a number of lightweight substitutes have been developed. One such device is disclosed in U.S. No. De. 247,291. The traction device of the patent utilizes a plurality of elongated traction members, each having fastening strips secured to their ends. The traction members are secured about the periphery of a tire by passing a pair of flexible belts through the fastening member at opposite sides of the tire. The outer surface of the traction members includes a plurality of pointed projections which are integrally formed with the traction element. However, as the traction device is used, the projections wear rapidly due to road abrasion. The outer surface of the traction members eventually becomes planar and the traction members lose a substantial portion of their effectiveness.

SUMMARY OF THE INVENTION

The principal object of the present invention is to provide a device for increasing the traction between a tire and the surface of a road. The device can be installed and removed with relative ease and yet is substantially as effective as conventional tire chains.

Another object of the invention is to provide a lightweight tire chain substitute which will incur substantially less wear and loss of effectiveness after prolonged use.

These and other objects of the invention are accomplished by utilizing a plurality of traction members which are mounted on a tire in substantially the same manner as are the traction devices illustrated in the aforementioned patent and are thus relatively easy to install and remove. However, the inventive traction members herein disclosed and described have a generally planar outer surface and a plurality of suction cavities are formed inwardly from the rear surface with a plurality of apertures extending between the suction cavity and recesses formed in the outer surface. As the tire rolls along a road surface, the traction members sequentially contact the road surface so that the suction cavities are sealed by the tire while the apertures are sealed by the road surface. Consequently, a suction is created in the suction cavity which draws the traction member toward both the tire and the road surface, thereby creating a traction which approaches the traction provided by conventional tire chains.

BRIEF DESCRIPTION OF THE DRAWINGS

FIG. 1 is an isometric view of the traction device installed on a conventional tire;

FIG. 2 is a top plan view of one member of the traction device;

DETAILED DESCRIPTION OF THE INVENTION

Figure 3:
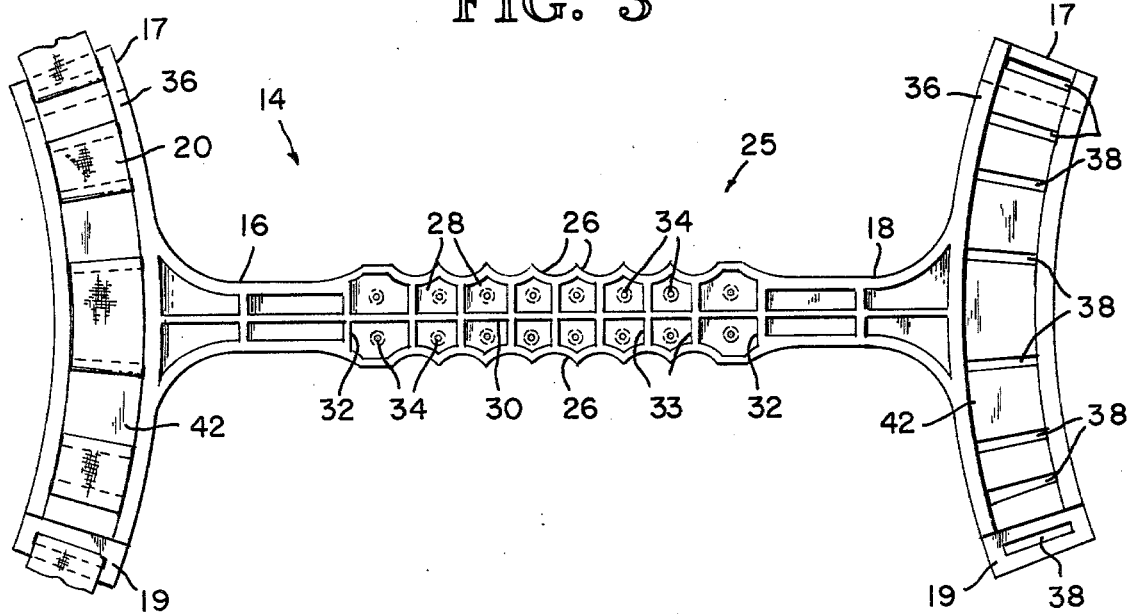
FIG. 3 is a bottom plan view of one member of the traction device.

The inventive traction device as shown in FIG. 1 is installed on a conventional tire 10. The device includes a plurality of traction members 12 molded in a single piece. Each traction member includes a central traction section 14 and fastening strips 16, 18. Fastening strips 16, 18 are formed at opposite ends of the traction sections. The fastening strips 16, 18 are formed to receive flexible belts or straps 20, 22, respectively, having their ends joined by conventional buckles, not shown.

Figure 4:
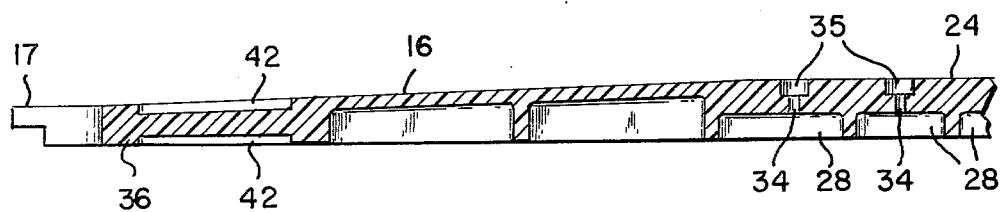
FIG. 4 is a cross-sectional view taken along the line 4—4 of FIG. 2.

The structural details of the traction sections 14 are illustrated in greater detail iln FIGS. 2-5. The traction section 14 includes a central gripping area having scalloped edges or sidewalls 26 as illustrated in FIG. 2. The outer surface of the traction section is generally planar, as best illustrated in FIG. 4. The inner face 25 of the traction section 14 as illustrated in FIG. 3 has formed therein a plurality of suction cavities 28 formed by the scalloped sidewalls 26, a central longitudinal wall 30, end walls 32 and transverse intermediate walls 33. A plurality of spaced-apart apertures 34 are formed in the plastic material and extend from the suction cavities 28 toward the planar outer surface of the traction section 14. Recesses 35 are formed on the outer surface of the traction sections 14 in alignment with the apertures 34. The recesses have a substantial diameter and extend to a depth of approximately one-half the thickness of the material between the outer surface and the cavities 28. Continuing from the base of each of the recesses 35 to the suction cavities are apertures 34 of relatively small diameter. Thus is provided a continuing air passage between the outer face 24 and suction cavities 28. As the tire 10 rolls along a road surface, the traction sections 14 contact the road surface, producing a vacuum and maintaining a suction within the suction cavities 28 which, through the recesses 35 and apertures 34, provide a relatively high degree of traction between the traction member, the tire and the road surface.

Figure 5:
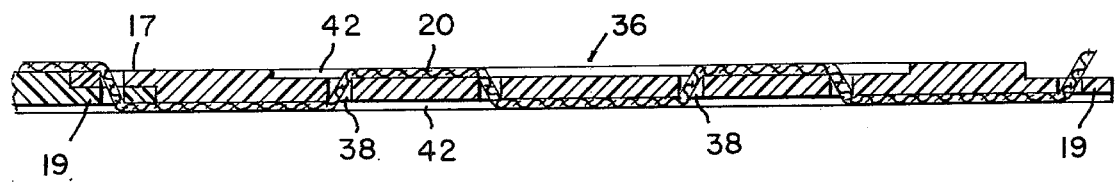
FIG. 5 is a cross-sectional view taken along the line 5—5 of FIG. 2.

As best illustrated in FIGS. 2, 4 and 5, the fastening strips 16, 18 are generally T-shaped and include an arcuate portions 36-36 containing a plurality of slots 38 for receiving conventional flexible belts 20, 22, preferably of woven nylon. As best illustrated in FIG. 5, the belts are recessed within cavities 42 formed in the inner and outer faces of the arcuate portions 36.

When the traction device is applied for use, it is installed in much the same manner as conventional tire chains. However, since the traction members 12 are relatively light in weight and are flexible, it is a relatively easy task to install the traction device. As the tire 10 rolls along a road surface, the traction sections 14 sequentially contact the road surface or a layer of ice or snow covering the road surface. As the wheels rotate, the weight of the vehicle applied to the traction section exhausts the air from the suction cavities. The contact between the tire 10 and the inner face of the traction section 14 seals the suction cavities 28, since the walls 26, 30, 32 completely contact the tire surface. Similarly, the recesses 35 and apertures 34 are sealed when the outer surface of the traction section 14 contacts the road surface. Under these circumstances, the air in the cavities is expelled, thereby creating a vacuum and a resulting suction and maintained within the suction cavities 28 which causes the traction section 14 to grip both the tire 10 and the road surface, thereby providing a relatively high degree of traction between the tire and the road surface. As the tire continues to roll along the road surface, the suction between either the suction cavities 28 and tire 10 and road surface is broken, thereby destroying the vacuum in the suction cavities 28.

The reason for providing the relatively larger diameter recesses 35 and the smaller aperture passages 34 is to create a greater pressure from the suction cavities to clear the recesses and apertures when the vacuum is broken incident to rotation of the tire. The velocity of air through the apertures will be of higher velocity and clear the apertures and recesses of dirt or passage plugging substances.

Figure 6:
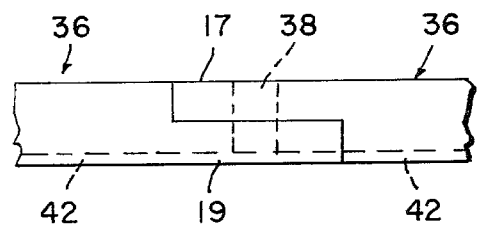
FIG. 6 is an enlarged side view illustrating the overlapping relationship of the fastening strips.

As is best illustrated in FIG. 6, the fastening strips 16, 18 are formed at their opposite ends 17, 19 with portions of reduced thickness so that the adjacent traction members may be caused to overlap. The belts 20 may then be laced through adjacent overlapping portions to hold the traction members in the overlapping relationship.

It can therefore be seen that the inventive traction device is relatively easy to install and remove and it is relatively more efficient in its traction creating capabilities.

I claim:

1. A device for increasing the traction of a tire on a road surface, comprising:

a plurality of traction members having generally planar inner and outer surfaces, a plurality of spacedly arranged suction cavities formed in the inner surface and a plurality of spacedly arranged recesses formed in the outer surface of each traction member, and a plurality of apertures, one extending between each of said suction cavities and said recesses in the road engaging outer surface of each of said traction members, said apertures having a smaller diameter than the diameter of said recesses; and fastening means for releasably securing said traction members to said tire at circumferentially spaced locations along the periphery thereof with the inner surfaces of said traction members abutting the periphery of said tire such that as said tire rolls along said road surface, said traction members sequentially contact said road surface with said tire sealing said suction cavities and said road surface sealing said apertures to create and maintain a suction within said suction cavities which is broken as said traction member lifts away from said road surface.

2. The traction device of claim 1, wherein said traction member comprises an elongated configuration, the longitudinal axis of which extends parallel to the rotational axis of said tire such that said traction member extends from one sidewall of said tire to the other.

3. The traction device of claim 2, wherein said fastening means comprises a pair of strips secured to respective ends of said traction members to extend laterally thereof and each arcuately formed to correspond to the curvature of said tire, and a pair of flexible, elongated retaining straps, each engaging all of the strips on a different side of said tire thereby retaining said traction members in position on said tire.

4. The traction device of claim 3, wherein said traction member and said fastening strips are integrally formed as a unit from a flexible, wear-resistant material.

5. The traction device of claim 3, wherein said strips each comprise a plurality of spacedly positioned apertures through which said retaining straps are threaded to hold said traction members to said tire.

6. The traction device of claim 1, wherein the edges of said traction member extending across the periphery of said tire are scalloped, thereby increasing the traction of said traction device.

7. The traction device of claim 1, wherein said traction member includes a planar outer panel containing a plurality of recesses communicating with said apertures and having walls extending around the marginal edges of said panel inwardly toward said tire to form said suction cavities.

* * * * *